June 6, 1961 J. WERNER 2,986,954
FLEXIBLE TOOTHED RACK CABLES
Filed April 6, 1960
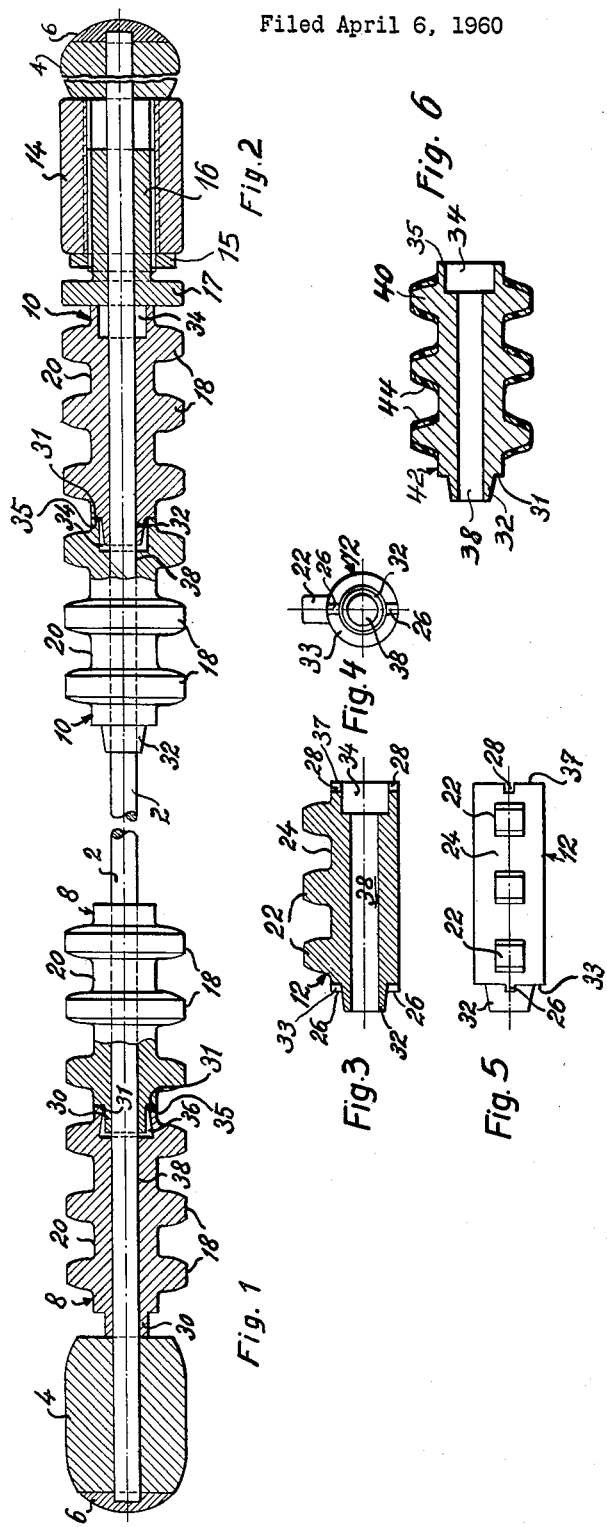

United States Patent Office 2,986,954
Patented June 6, 1961

2,986,954
FLEXIBLE TOOTHED RACK CABLES
Johannes Werner, Offenbach am Main, Germany, assignor to H. T. Golde G.m.b.H., & Co. K.G., Frankfurt am Main, Germany
Filed Apr. 6, 1960, Ser. No. 20,469
Claims priority, application Germany Apr. 18, 1959
6 Claims. (Cl. 74—501)

The invention relates to toothed rack cables with rope-like core and a gear tooth system mounted thereon.

The known flexible toothed rack cables are open to various objections. In one type of toothed rack cable the gear tooth system is formed by an operative winding or the like wound in helical fashion on a relatively thick core. If the wire is chosen of relatively great thickness in order to obtain greater depth of engagement, there is the danger of it slipping in axial direction along the core. It has been endeavored to avoid this by applying a thin wire between the operative winding so as to form stabilizing windings. By this measure, however, the depth of engagement, that is the depth of the tooth gaps, is reduced considerably.

In other toothed rack cables, the teeth are provided in the form of beads threaded on a core composed of wire or rope-like material. These beads have a thickened tooth portion in axial direction and a thinner neck portion, and they interengage at their ends in hinge fashion. Thus each bead forms a tooth. In the case of these known toothed rack cables it is not possible to transmit forces worth mentioning from the teeth to a gear element cooperating with it, or vice versa, because the exerted torque causes an inclination of the bead axis in relation to the cable axis. This is, on the one hand, unfavorable for the transmission of forces and can, on the other hand, lead to the tooth becoming wedged in a guide usually surrounding the toothed rack cable. These disadvantageous effects can be kept within permissible limits if the depth of engagement is kept shallow and the gear elements cooperating with such a toothed rack cable are so constructed that they almost completely surround the bead-like teeth coming into engagement with them. This means, however, that such a toothed rack cable can only be moved slowly.

The object of the invention is therefore to produce a flexible toothed rack cable in the tooth gaps of which the teeth of a gear element cooperating with the cable, for example a driving pinion, can engage to a relatively great depth so that the forces transmitted between the gear element and the toothed rack cable can be practically as great as in the case of a rigid toothed rack.

Another object of the invention is to produce a flexible toothed rack cable in which the profile of the teeth can be constructed in the manner which has proved satisfactory in the case of rigid toothed racks, for example, as a cycloidal or an involute tooth system, ensuring fast and silent running of the toothed rack cable over the coordinated gear element and thereby offers high force transmission efficiency.

A further object of the invention consists in producing a flexible toothed rack cable which has maximum flexibility outside the effective range of the coordinated gear element and nevertheless acts in the effective range practically like a rigid toothed rack.

Yet another object of the invention is to produce a flexible toothed rack cable having connecting elements between the individual toothed members, preventing radial displacement of the members but having a certain play permitting a limited overall deflection between the members.

A further object of the invention is to produce a flexible toothed rack cable closed at both ends by means of seals firmly connected with the cable core and has a tensioning or stretching device for the core on one end thereof. A special object of the invention is to construct this stretching device so that the pretensioning of the cable core can be selected and adjusted to suit the actual purpose for which the cable is intended.

Still another object of the invention is to regulate the flexibility in a flexible toothed rack cable by the length of the toothed members and the number of the teeth.

Finally the invention also has for its object to produce a particularly smooth running toothed rack cable by applying a plastic coating to the toothed members or constructing the members and, if desired, also the cable core from synthetic material.

Other objects, characteristics and advantages of the invention will become apparent from the following description of several embodiments of the invention, from the drawing and the appended claims.

In the drawing

FIG. 1 shows one form of construction of the toothed rack cable with one of its ends partly in section;

FIG. 2 shows a slightly modified form of construction according to the invention in which the end of the toothed rack cable carrying the stretching device is shown partly in section;

FIGS. 3 to 5 show, respectively, a longitudinal section, a side elevation and a top plan view of a toothed rack cable member of yet another form of construction, while FIG. 6 shows in section a toothed member for a toothed rack cable according to the invention, the teeth being coated with plastic.

The toothed rack cables according to the invention are built up in the following fashion:

In the interior of the toothed rack cables there is a cable core 2. On this cable core 2 teeth carrying members 8, 10, 12 or 42 are threaded (FIGS. 1–3 and 6, respectively) by means of their longitudinal bores 38, depending upon the use of the particular embodiment. The toothed rack cables according to the invention are closed at both ends by means of seals 4. These seals have a longitudinal bore and are threaded as last members onto the cable cores 2. The cable cores are firmly connected at points 6 to the outer ends of each of the seals 4. This connection can be produced by welding, hard-soldering or the like.

At one end of the cables, a tensioning or stretching device is inserted between the last one-piece, teeth carrying members 8, 10, 12 or 42 and the seals 4. This device is threaded on the cable core 2 as last member but one. This stretching device is shown only in FIG. 2 but is also provided on the end not shown of the cable according to FIG. 1 in the same manner, and can also be applied to the other cable embodiments. The stretching device consists of a screw-threaded sleeve 16 which bears with a hexagonal head 17 or the like against the last teeth carrying members 8, 10, 12 or 42, and of a nut 14, for example, a hexagonal nut, which is screwed onto this sleeve 16 and bears against the seal 4. The nut 14 can be secured against rotation by a counter nut 15. The cable core 2 can be given any desired pretensioning by means of this stretching device, as will be described later.

In the embodiments illustrated in FIGS. 1 and 2, the respective one-piece members 8 and 10 are axially symmetrical. The members have a number of between peripheral tooth profile discs 18 between with peripheral tooth gap grooves 20 therebetween. These discs 18 are given a conventional tooth profile such as has proved satisfactory for rigid toothed racks. For this purpose cycloidal or involute tooth systems are best suited. The tooth gaps correspond, of course, to the tooth profile. In two embodiments of the invention, each member 8 or 10 is provided with three tooth profile discs 18 and two peripheral grooves 20, whereas the width of a third peripheral groove is divided between the two ends of adjacent members.

It is possible to construct the members 8 or 10 in greater or lesser length and with more or fewer tooth gap peripheral discs 18 and tooth gap peripheral grooves 20 than shown. Longer members will be chosen when less flexibility is required for the toothed rack cable. If greater flexibility is desired, the teeth carrying members will be made shorter and with correspondingly fewer teeth. This modification of the flexibility has no influence on the type of tooth system because, as will be hereinafter described, the toothed rack cables according to the invention behave practically like rigid toothed racks in the effective range of the gear element, for example a pinion, when cooperating with them, provided there are at least two teeth on each member.

FIGS. 3 to 5 show the teeth carrying member 12 having teeth 22 threadable on the cable core 2 by means of the longitudinal bore 38. This member 12 differs from the members 8 and 10 in that it has one-sided tooth profile cams 22 which, as shown in Fig. 4, extend only on a portion of the member periphery. The tooth gaps 24 arranged between these cams 22 extend to the outer circumference of the sleeve-like member 12. The seals 4 and the stretching device 14—17 is provided in this construction with a cross-sectional profile shown in FIG. 4 and a longitudinal profile shown in FIGS. 1 and/or 2. The same tooth systems as mentioned before come into consideration for a toothed rack cable according to FIGS. 3 to 5.

In the construction illustrated in FIGS. 3 to 5 it is necessary to secure the individual members 12 against rotation so as to ensure that the tooth profile cams 22 of all the members are in alignment. For this purpose, lugs 26 are cast on one end of the members 12 while their other ends are provided with recesses 28 in which the lugs engage. The seals 4 and the elements of the stretching device may be provided with similar lug-and-recess portions to prevent them from turning.

In order to secure the members 8, 10, 12 and 42 against radial displacement, each member is provided with an axial extension at one of its ends and with a recess at the other. In FIG. 1, these are respectively numbered 30 and 36, while in FIGS. 2 and 3–5 there are identified by numerals 32 and 34. When the members 8, 10 or 12 are threaded on the core 2, the axial extensions 30 or 32 engage with a certain play the respective recesses 36 or 34 so as to allow the members a limited movement in relation to each other. The axial extensions 30 and 32 of the toothed members 8 and 10 are surrounded by ring-shaped flat seating surfaces 31 which are arranged on one end face of each member perpendicular to the axial direction thereof. On its other face, each toothed member 8 and 10 has a second ring-shaped flat seating surface 35 arranged perpendicular to the axial direction of the member. These surfaces 35 surround the recesses 34 and 36, and correspond in diameter to the seating surfaces 31.

The axial extensions 30 of the cable embodiment shown in FIG. 1 are cylindrical and the recesses 36 are widening conically in inward direction. As an alternative, cylindrical recesses 34 and axial extensions 32 tapering conically from the end of the member are shown in FIGS. 2 and 3 to 5.

In case of the members 12 of FIGS. 3 to 5, the extensions 32 are surrounded by a seating surface 33 which consists of two semicircles between the lugs 26 while the seating surfaces 37 are shaped as two semicircles between the recesses 28 and surround the recesses 34.

The effect of the ring-shaped seating surfaces 31, 35 or 33, 37 consists in that the toothed members in mesh with the driving pinion press with their front seating surfaces against the rear seating surfaces of the preceding toothed members and thus transmit a portion of the force exerted on them. Thus the adjoining toothed members mutually adjust themselves and act practically like parts of a rigid toothed rack. The tooth gap between the toothed member in mesh with the driving pinion and the following toothed member is kept at the correct distance by the fact that the cable core transmits a portion of the force exerted on the driven toothed member by a pull in rearward direction right up to the cable end. The engaging tooth of the driving pinion can therefore enter without difficulty the tooth gap between the meshing and the following toothed members. As soon as mesh is established with the first tooth of the next toothed member, the above described adjusting effect of the seating surfaces comes into action.

The material from which the toothed members 8, 10, 12 or 42 and the cable cores 2 are made can be selected to meet the particular requirements. For transmitting relatively heavy forces, the cable core may, for example, be of steel wire, such as piano wire or the like, or of wire rope, stranded steel wire or the like. The members 8, 10 and 12 will in such case be made from metals such as stainless steel, brass or the like. The seals 4 and the stretching device may then also be made from the same metal. In the form of construction illustrated in FIGS. 1 and 2 the members 8 and 10 can be made by turning. For special purposes, for example when the forces to be transmitted are not excessive and when particularly smooth running of the toothed rack cable is desired, the teeth carrying members 8, 10 and 12 can be made from plastic material and, if desired, the cable core 2 may also be made from plastic material, for example, of polyamide base.

As shown in FIG. 6, the invention also offers the possibility of coating the teeth 40 of a member 42 with a layer of plastic 44 so as to reduce friction and ensure silent running of the cable according to the invention. Other features of member 42 are similar to those of member 10 shown in FIG. 2.

When building the cable according to the invention, one end of the cable core 2 is preferably rigidly connected to a seal 4 and then the appropriate ones of members 8, 10, 12 or 42 are threaded on to the cores 2 in the desired number. These are followed by the stretching device 14—17 with the nut 14 screwed right on to the screw-threaded sleeve 16. Finally the second seal 4 is fitted in position, the protruding end of the cable cut off and the end of the core firmly connected to the second seal. As soon as a firm connection has been produced between the ends of the cable core and the two seals, the desired pretensioning is imparted to the cable core 2 by turning the nut 14 in relation to the head 17 of the sleeve 16. Thereupon the sleeve 16 and the nut 14 are locked against turning by means of the counter nut 15, soldering, notching or varnishing the screw thread.

A particular advantage of the cable according to the invention is that, when loaded, the tooth-carrying members 8, 10, 12 or 42 running towards the driving pinion are not subjected to any pulling stress and consequently do not undergo elastic deformation. The pretensioning of the cable core also ensures that the tooth-carrying members are in close contact with each other at their ends. This also ensures that the teeth spacing of the members is always maintained, with the result that the wear of both the toothed rack cable and the driving pinion is kept to a minimum. The forces acting on the member actually in mesh with the driving pinion are transmitted as a tensional stress by the prestressed core in rearward direction and as a thrust by the respective seating surfaces in forward direction. The teeth-carrying member in mesh with the driving pinion cannot therefore swing transversely to the axial direction and wedge in the guide for the toothed rack cable under the action of a torsional moment. This is an important advantage since the guide for an axially movable, flexible cable usually consists of a rather narrow channel or tube with a view to avoiding lateral displacement of the cable.

I claim:
1. A flexible toothed rack cable, comprising a core made from a material selected from the group including steel wire, steel cable and plastics; tubular toothed members threaded on said core interengaging with play and braced together along the entire length of the cable; at least two teeth on each of said toothed members having conventional tooth profiles and intervening spaces forming tooth gaps corresponding to the tooth profiles; annular seating surfaces on the end faces of said toothed members, the seating surfaces of neighboring toothed members bearing tightly against one another, each of said members having on one of its end faces, within said annular seating surface, an axially extending recess and on the other end face, also within said annular seating surface, an extension fitting with play into a recess of an adjoining toothed member, the play between said recess and said extension increasing towards the bottom of the recess when said members are fitted together; and connecting elements within said seating surfaces interengaging with a limited amount of play to allow said members to turn a permissible amount in relation to each other.

2. A flexible toothed rack cable, comprising a core made from a material selected from the group including steel wire, steel cable and plastics; tubular toothed members threaded on said core interengaging with play and braced together along the entire length of the cable; at least two teeth extending over a portion of the periphery of said members, said teeth having conventional tooth profiles and intervening spaces forming tooth gaps corresponding to the tooth profiles; annular seating surfaces on the end faces of said toothed members, the seating surfaces of neighboring toothed members bearing tightly against one another; means on said members preventing them from rotating in relation to each other; and connecting elements within said seating surfaces interengaging with a limited amount of play to allow said members to turn a permissible amount in relation to each other.

3. A flexible toothed rack cable, comprising a core made from a material selected from the group including steel wire, steel cable and plastics; tubular toothed members threaded on said core interengaging with play and braced together along the entire length of the cable; at least two teeth on each of said toothed members, having conventional tooth profiles and intervening spaces forming tooth gaps corresponding to the tooth profiles; annular seating surfaces on the end faces of said toothed members, the seating surfaces of neighboring toothed members bearing tightly against one another; connecting elements within said seating surfaces interengaging with a limited amount of play to allow said members to turn a permissible amount in relation to each other; a seal applied to each end of the cable and firmly connected to said core; and a device for tensioning the core, comprising a screw-threaded sleeve with a nut threaded on said sleeve, said device being inserted on the core between the seal and the last toothed member so that said device adjustably spaces apart the last toothed member and the seal closing the end of the cable.

4. A flexible toothed rack cable comprising an elongated core, toothed members having an internal threaded portion adapted to be strung on said core, at least two teeth on each of said members, annular seating surfaces on the ends of said members, the seating surfaces of neighboring members bearing against one another, said members having on their ends connecting portions comprising an axially extending recess on one end and an extension on the other for loose fit, one of said connecting portions being tapered, and connecting means within said seating surfaces to allow a permissible amount of rotation of said members.

5. A flexible toothed rack cable as set forth in claim 4, wherein said teeth of the members extend only over a peripheral portion of said members, further comprising means on said members for preventing their rotation in relation to said core.

6. A flexible toothed rack cable as set forth in claim 4, further comprising a seal secured to both ends of said core adapted to close the ends of the cable, and tensioning means strung on one end of said core and comprising a sleeve and a nut secured to said sleeve, whereby upon insertion of said tensioning means between said seal and the last member of the cable the strung members can be tensioned between the two ends of the cable.

References Cited in the file of this patent

FOREIGN PATENTS

| | | |
|---|---|---|
| 418,749 | Great Britain | Oct. 31, 1934 |
| 787,765 | Great Britain | Dec. 18, 1957 |
| 1,064,982 | France | May 19, 1954 |